A. BROCK, Jr.
FILM CAMERA.
APPLICATION FILED JUNE 23, 1917.
1,300,114.
Patented Apr. 8, 1919.
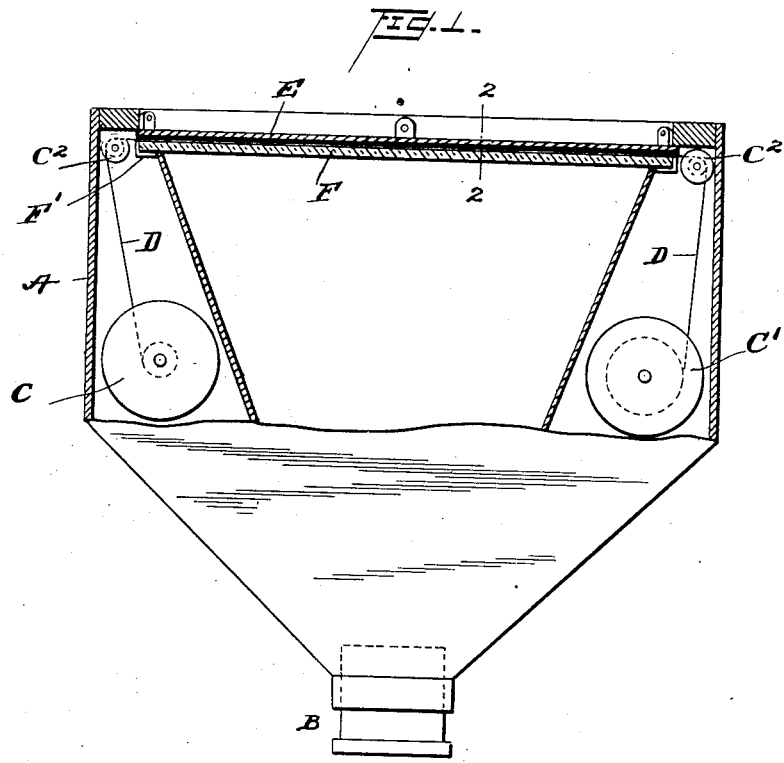
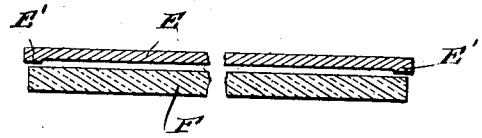
Witness
Harold Strauss
Inventor
Arthur Brock Jr
By Francis T. Chambers
His Att'y

UNITED STATES PATENT OFFICE.

ARTHUR BROCK, JR., OF PHILADELPHIA, PENNSYLVANIA.

FILM-CAMERA.

1,300,114.  Specification of Letters Patent.  Patented Apr. 8, 1919.

Application filed June 23, 1917. Serial No. 176,493.

*To all whom it may concern:*

Be it known that I, ARTHUR BROCK, Jr., a citizen of the United States of America, residing in the city and county of Philadelphia, in the State of Pennsylvania, have invented certain new and useful Improvements in Film-Cameras, of which the following is a true and exact description, reference being had to the accompanying drawings, which form a part thereof.

My present invention has for its object to provide a film camera with simple and effective film guiding means adapted for the successful production of large film negatives comparable in size with large plate negatives, notwithstanding the tendency to wave effects in, and the buckling of the film which have heretofore made it practically impossible to make film negatives comparable in size with the larger plate negative.

The various features of novelty which characterize my invention are pointed out with particularity in the claims annexed to and forming a part of this specification. For a better understanding of the invention, however, as to the manner in which I accomplish the results sought reference should be had to the accompanying drawings in which I have illustrated a preferred embodiment of my invention.

Of the drawings:

Figure 1 is an elevation, partly in section, of a film camera.

Fig. 2 is a partial section on the line 2—2 of Fig. 1.

In the drawings I have somewhat conventionally illustrated a camera comprising a casing A, lens B, and film feeding rolls C and C' by means of which the film D is fed through the position of exposure. C² represent parallel guide rolls between which extends the portion of the film D in the position for exposure.

The portion of the film in the position for exposure is located between a glass plate F interposed between the film and the lens B, and a backing plate E ordinarily formed of metal. The plate E is shown as provided with lugs by means of which it may be secured to the camera housing, and the plate F is shown as supported by means of hangers or brackets F' secured to the camera housing. The plate E is provided with ribs E' at its side edges which engage the longitudinal edges of the film and are spaced away from the glass plate F by a distance approximately equal to the thickness of the film material. Between the edges E' the plate E is cut away or recessed to a very slight depth, say .005 of an inch.

With the film section in the position of exposure, supported between the glass plate F and the metal backing plate E, as described, there is no possibility for the film to bend or buckle enough to have any very material effect on the optical characteristics of the negative formed by exposing and developing the film, whereas if the film is not so supported the negative will almost invariably be badly distorted because of the bending and buckling of the film material if the negative is large, and by the term "large" I mean to include negatives which are 12 inches square, or larger. The recessing of the backing plate E so that it continuously engages the film, only along narrow lines at the side edges of the film, avoids two serious difficulties which would be experienced if the backing plate were uniformly separated from the adjacent side of the glass plate E by a distance approximately equal to the thickness of the film material. One of these difficulties arises from the polishing effect which the film would then exert against the metal backing plate E, tending to give the latter a reflecting surface and to thereby introduce optical faults. The other difficulty would arise from the generation of static electricity by the rubbing contact of all, or a large portion, of the back of the film against the plate E, and the consequent small flash discharges of electricity between the plate E and the film over exposed portions of the latter. Such flash discharges introduce optical defects in the negatives. By recessing the plate the frictional generation of electricity is reduced, and the discharges are largely confined to the edges of the film.

While in accordance with the provisions of the statutes I have illustrated and described the best form of my invention now known to me, it will be apparent to those skilled in the art that changes may be made in the apparatus disclosed without departing from the spirit of my invention as set forth in the appended claims.

Having now described my invention, what I claim as new and desire to secure by Letters Patent, is:

1. In a film camera the combination with the camera housing and lens, of film guiding means supporting the section of the film in position for exposure, and comprising a glass plate through which exposure takes place, and a plate located at the opposite side of the film from the glass plate, and having opposite side edges separated from the glass plate by a distance approximately equal to the thickness of the film and being slightly cut away between said side edges.

2. In a film camera a combination with a camera housing, a lens, and film feeding mechanism of film guiding means supporting the section of the film in position for exposure and comprising a glass plate through which exposure takes place and a metal plate at the opposite side of the film from the glass plate, and having its side edges separated from the glass plate by a distance approximately equal to the thickness of the film and having its body portion separated from the glass plate by a slightly greater distance.

ARTHUR BROCK, Jr.